(12) United States Patent
Kim et al.

(10) Patent No.: US 9,159,154 B2
(45) Date of Patent: Oct. 13, 2015

(54) IMAGE PROCESSING METHOD AND APPARATUS FOR GENERATING DISPARITY VALUE

(71) Applicant: SAMSUNG ELECTRONICS CO., LTD., Suwon-si (KR)

(72) Inventors: Ji Won Kim, Seoul (KR); Ho Young Lee, Suwon-si (KR); Du Sik Park, Suwon-si (KR); Young Ju Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 13/744,916

(22) Filed: Jan. 18, 2013

(65) Prior Publication Data

US 2013/0182945 A1 Jul. 18, 2013

(30) Foreign Application Priority Data

Jan. 18, 2012 (KR) ........................ 10-2012-0005746

(51) Int. Cl.
*G06K 9/00* (2006.01)
*G06T 15/00* (2011.01)
*G06T 5/00* (2006.01)
*H04N 13/00* (2006.01)

(52) U.S. Cl.
CPC ................ *G06T 15/00* (2013.01); *G06T 5/002* (2013.01); *H04N 13/0022* (2013.01); *G06T 2207/10012* (2013.01); *G06T 2207/10028* (2013.01); *H04N 2013/0081* (2013.01)

(58) Field of Classification Search
None
See application file for complete search history.

(56) References Cited

U.S. PATENT DOCUMENTS

| 6,373,485 | B2 | 4/2002 | Sowizral et al. |
| 6,456,394 | B1 * | 9/2002 | Gwaltney et al. ............... 358/1.9 |
| 2002/0000986 | A1 | 1/2002 | Sowizral et al. |
| 2006/0227137 | A1 | 10/2006 | Weyrich et al. |
| 2011/0080464 | A1 * | 4/2011 | Alessandrini et al. .......... 348/42 |
| 2011/0298898 | A1 * | 12/2011 | Jung et al. ........................ 348/47 |
| 2012/0141016 | A1 * | 6/2012 | Wildeboer et al. ............ 382/154 |

FOREIGN PATENT DOCUMENTS

| KR | 10-2008-0047459 | 5/2008 |
| KR | 10-2008-0047459 A | 5/2008 |
| KR | 10-2010-0137282 | 12/2010 |
| KR | 10-2010-0137282 A | 12/2010 |
| KR | 10-2011-0024966 A | 3/2011 |

(Continued)

OTHER PUBLICATIONS

Appu Shaji et al., "Resolving Occlusion in Multiframe Reconstruction of Deformable Surfaces", pp. 31-36, 2011.

(Continued)

*Primary Examiner* — Siamak Harandi
(74) *Attorney, Agent, or Firm* — NSIP Law

(57) ABSTRACT

A method and apparatus for processing an image is provided. The image processing apparatus may adjust or generate a disparity of a pixel, by assigning similar disparities to two pixels that are adjacent to each other and have similar pixels. The image processing apparatus may generate a final disparity map that may minimize energy, based on an image and an initial disparity map, under a predetermined constraint. A soft constraint or a hard constraint may be used as the constraint.

22 Claims, 9 Drawing Sheets
(4 of 9 Drawing Sheet(s) Filed in Color)

(56) References Cited

FOREIGN PATENT DOCUMENTS

| KR | 10-2011-0027373 | 3/2011 |
| KR | 10-2011-0027373 A | 3/2011 |

OTHER PUBLICATIONS

Dahua Lin et al., "Quality-Driven Face Occlusion Detection and Recovery", pp. 1-7, 2007.

Zhu, J. et al. "Spatial-temporal fusion for high accuracy depth maps using dynamic MRFs," IEEE Transactions on Pattern Analysis and Machine Intelligence, vol. 32 No. 5, May 2010 (12 pages).

Tian, C. et al., "Upsampling range camera depth maps using high-resolution vision camera and pixel-level confidence classification," Proceedings of IS&T/SPIE Electronic Imaging, International Society for Optics and Photonics, 2011 (10 pages).

Extended European Search Report issued on Mar. 9, 2015 in European Application No. 13151936.5 (7 pages).

\* cited by examiner

IMAGE PROCESSING METHOD AND APPARATUS FOR GENERATING DISPARITY VALUE

CROSS-REFERENCE TO RELATED APPLICATIONS

This application claims the priority benefit of Korean Patent Application No. 10-2012-0005746, filed on Jan. 18, 2012, in the Korean Intellectual Property Office, the disclosure of which is incorporated herein by reference.

BACKGROUND

1. Field

One or more example embodiments relate to a method and apparatus for processing an image, and more particularly, to an apparatus and method that may generate a final disparity map based on an image and an initial disparity map.

2. Description of the Related Art

When scene reconstruction or depth estimation is performed based on stereo images or multi-view images, a portion of a predetermined object or the whole predetermined object may be observed in a particular view, however, may not be observed in other views. For example, when a camera capturing an object is moved or when a viewpoint from which an object is viewed is changed, an area that was not shown prior to changing the viewpoint may now be seen from the changed viewpoint. This occurrence may be referred to as occlusion.

An occluded portion may not have correspondences in multiple views. Accordingly, a three-dimensional (3D) position of the occluded portion may not be estimated theoretically.

In order to resolve a problem resulting from the occlusion, various methods of handling occlusions may be used.

SUMMARY

The foregoing and/or other aspects are achieved by providing an image processing apparatus, including a receiving unit to receive an image including color information of pixels, and an initial disparity map including disparity information of the pixels, a constraint determining unit to determine a constraint, and a generating unit to generate a final disparity map by assigning similar disparities to two pixels that are adjacent to each other and have similar colors, among the pixels, under the determined constraint. Here, a portion of the pixels may correspond to pixels for which disparity values are undetermined by the initial disparity map, and the final disparity map may include disparity values of all of the pixels.

The constraint may correspond to a hard constraint in that pixels having disparity values determined by the initial disparity map, among the pixels, may have identical disparity values in the final disparity map.

The generating unit may generate the final disparity map by determining a disparity value of each of the pixels, to reduce energy.

The energy may increase in accordance with an increase in a difference between a disparity value of a first pixel and a color-similarity-weighted disparity value of neighboring pixels of the first pixel.

The first pixel may correspond to a predetermined pixel among the pixels.

The neighboring pixels of the first pixel may correspond to pixels positioned within a range predetermined based on coordinates of the first pixel, among the pixels.

The constraint may correspond to a soft constraint in that the energy may increase in accordance with an increase in a difference between a disparity value of a second pixel in the initial disparity map and a disparity value of the second pixel in the final disparity map.

The generating unit may add a fourth pixel in a previous frame to a neighboring pixel of a third pixel in a current frame.

Coordinates of the third pixel in the current frame may be identical to coordinates of the fourth pixel in the previous frame.

The current frame may include the image and the initial disparity map.

The previous frame and the current frame may correspond to temporally consecutive frames.

The generating unit may assign an initial disparity value to at least one of the pixels for which disparity values are undetermined.

The generating unit may assign the initial disparity value to at least one of the pixels for which disparity values are undetermined, in a form of a ramp.

The image processing apparatus may further include a decompressing unit to decompress the image and the initial disparity map when the image and the initial disparity are compressed.

The pixels for which disparity values are undetermined may be generated due to data of the initial disparity map that is lost as a result of compressing the initial disparity map.

The image processing apparatus may further include an up-scaling unit to up-scale the image and the initial disparity map.

The foregoing and/or other aspects are also achieved by providing an image processing method, including receiving an image including color information of pixels, and an initial disparity map including disparity information of the pixels, determining a constraint, and generating a final disparity map by assigning similar disparities to two pixels that are adjacent to each other and have similar colors, among the pixels, under the determined constraint. Here, a portion of the pixels may correspond to pixels for which disparity values are undetermined by the initial disparity map, and the final disparity map may include disparity values of all of the pixels.

The foregoing and/or other aspects are also achieved by providing an image processing apparatus. The apparatus includes a receiving unit to receive an image comprising color information of pixels and an initial disparity map comprising disparity information of the pixels, wherein at least a portion of the pixels in the initial disparity map are disparity-undetermined pixels having undetermined disparity values, a constraint determining unit to determine a constraint, and a generating unit to generate a final disparity map by assigning similar disparities to two pixels that are adjacent to each other, from among the pixels, under the determined constraint, the final disparity map comprising a disparity value for each of the pixels.

The generating unit of the image processing apparatus may assign similar disparities to the two adjacent pixels when one of the pixels is a disparity-undetermined pixel and another of the pixels has a determined disparity value and has a color similar to a color of the disparity-undetermined pixel.

Additional aspects of embodiments will be set forth in part in the description which follows and, in part, will be apparent from the description, or may be learned by practice of the disclosure.

BRIEF DESCRIPTION OF THE DRAWINGS

The patent or application file contains a least one drawing executed in color. Copies of this patent or patent application publication with color drawing(s) will be provided by the Office upon request and payment of the necessary fee. These and/or other aspects will become apparent and more readily appreciated from the following description of embodiments, taken in conjunction with the accompanying drawings of which.

DETAILED DESCRIPTION

Figure 1:
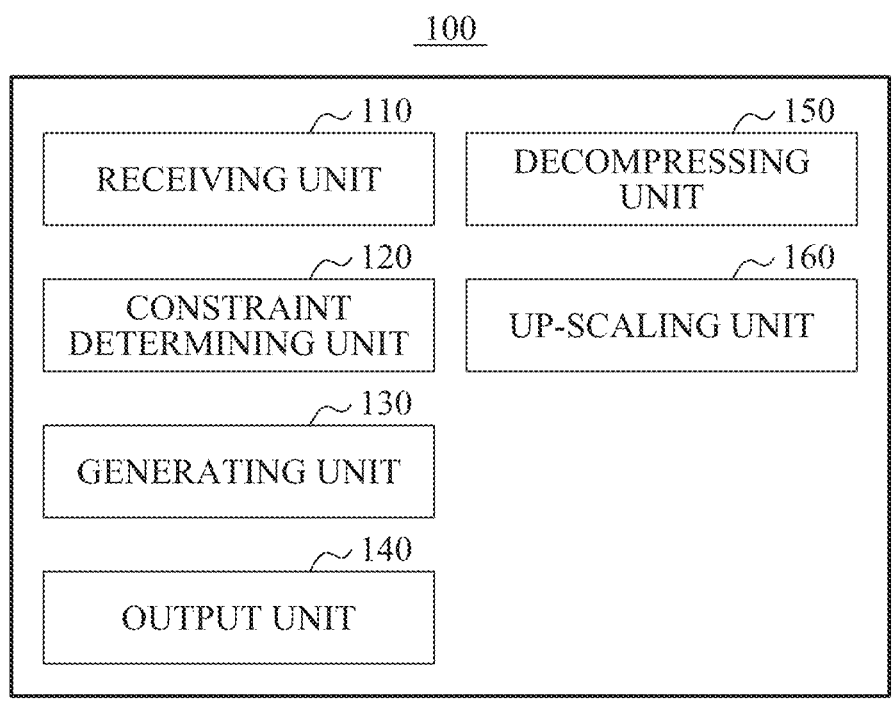
FIG. 1 illustrates an image processing apparatus according to example embodiments.

This patent or application file contains at least one drawing executed in color. Copies of the patent or patent application publication with color drawings will be provided by the Office upon request and payment of the necessary fee. Reference will now be made in detail to embodiments, examples of which are illustrated in the accompanying drawings, wherein like reference numerals refer to the like elements throughout. Embodiments are described below to explain the present disclosure by referring to the figures.

A disparity of a pixel and a depth of the pixel are inversely proportional to each other. Accordingly, the disparity and the depth are used interchangeably herein. The disparity may be replaced with an inverse number of the depth, and a disparity value may be replaced with an inverse number of a depth value. For example, a disparity map may be replaced with a depth map.

FIG. 1 illustrates an image processing apparatus 100 according to one or more example embodiments.

The image processing apparatus 100 may include, for example, a receiving unit 110, a constraint determining unit 120, a generating unit 130, an output unit 140, a decompressing unit 150, and an up-scaling unit 160.

Functions of the aforementioned elements 110 through 160 will be described in detail with reference to FIGS. 2 through 11.

Figure 2:
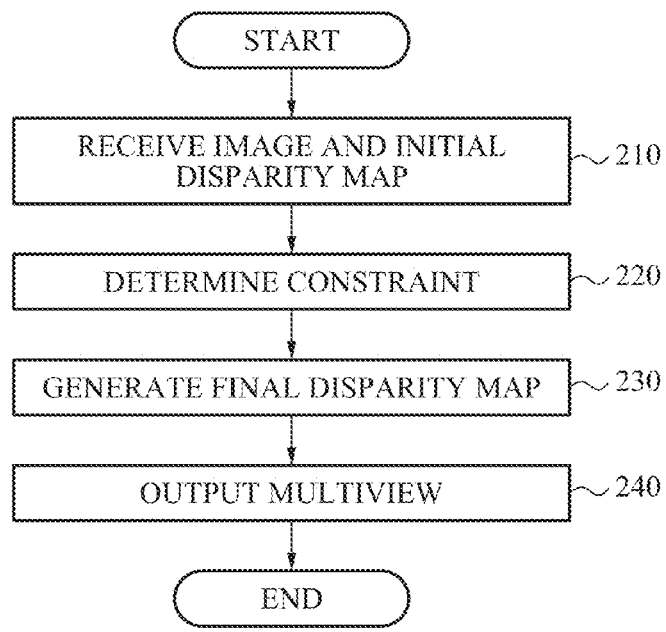
FIG. 2 illustrates an image processing method according to example embodiments.

FIG. 2 illustrates an image processing method according to example embodiments.

In operation 210, the receiving unit 110 may receive an image and an initial disparity map.

The receiving unit 110 may receive the image and the initial disparity map from an external environment, via a network, and the like. The receiving unit 110 may read the image and the initial disparity map from a storage unit of the image processing unit 100.

The image may include color information of pixels. The initial disparity map may include disparity information of the pixels. That is, the image may include color values of the pixels. The initial disparity map may include disparity values of the pixels. Hereinafter, the pixels constituting the image and the initial disparity map will be referred to as constituent pixels.

A portion of the constituent pixels may correspond to pixels for which disparity values are undetermined. The pixels for which disparity values are undetermined by the initial disparity map may be referred to as disparity-undetermined pixels. That is, the initial disparity map may not include disparity values of the pixels for which disparity values are undetermined.

The image may be classified into an area in which a confidence is relatively high, hereinafter referred to as a high confidence area, and an area in which the confidence is relatively low, hereinafter referred to as a low confidence area. Each of the high confidence area and the low confidence area may include one or more pixels. The initial disparity map may provide disparity values with respect to pixels positioned in the high confidence area only, among the areas in the image. That is, pixels positioned in the low confidence area may correspond to disparity-undetermined pixels and may not be included in the initial disparity map. Accordingly, since the disparity values may not be provided by the initial disparity map, the low confidence area may be referred to as an empty area. Also, since the disparity values may be provided by the initial disparity map, the high confidence area may be referred to as an area in which a disparity value is filled.

In operation 220, the constraint determining unit 120 may determine a constraint to be imposed when the generating unit 130 generates a final disparity map. The constraint may correspond to a hard constraint or a soft constraint. The hard constraint and the soft constraint will be described later.

In operation 230, the generating unit 130 may generate a final disparity map, under the constraint determined by the constraint determining unit 120. The generating unit 130 may generate the final disparity map by filling disparity values in remaining empty areas, excluding a high confidence area, when an initial disparity map in which disparity values are filled only in the high confidence area is provided.

The generating unit 130 may employ a predetermined occlusion handling scheme which may be referred to as disparity fitting. The disparity fitting may refer to a principle of assigning similar disparities to two pixels adjacent to each other when the two pixels have similar color values. The disparity fitting may be based on Quadratic Programming (QP). Hereinafter, the disparity fitting based on the QP will be referred to as QP disparity fitting.

That is, the generating unit 130 may generate the final disparity map by assigning similar disparities to two pixels, among the constituent pixels, that may be adjacent to each other and may have similar colors.

The final disparity map may provide disparity values of the pixels for which disparity values are undetermined. That is, the generating unit 130 may assign disparity values to the one or more pixels for which disparity values are undetermined. The generating unit 130 may determine a disparity value of a disparity-undetermined pixel, based on a disparity value of a pixel that may be adjacent to the disparity-undetermined pixel and that may have a determined disparity value and a color similar to a color of the disparity-undetermined pixel. The final disparity map may include disparity values for all the constituent pixels.

The generating unit 130 may assign disparity values to empty areas or the pixels for which disparity values are undetermined based on color similarity, as expressed by Equation 1 and Equation 2. Equation 1 may correspond to a fitting energy formula.

$$E(\tilde{d}) = \sum_{d_i \in \tilde{d}} \left\{ d_i - \sum_{d_j \in N(d_i)} \alpha_{ij} d_j \right\}^2 \quad \text{[Equation 1]}$$

$$= \frac{1}{2} \tilde{d}^T Q \tilde{d}$$

$$\frac{dE}{d\tilde{d}} = Q\tilde{d} \quad \text{[Equation 2]}$$

In Equation 1, energy E is represented as a sparse linear system. Equation 1 and Equation 2 may represent disparity energy modeling based color similarity.

d denotes a vector including disparity values of pixels in the initial disparity map. That is, d denotes an input disparity vector. $\tilde{d}$ denotes a vector including disparity values of pixels in the final disparity map. That is, $\tilde{d}$ denotes a final disparity vector.

Here, $d_i$ denotes a disparity value of a predetermined pixel, among the constituent pixels in the final disparity map. When n pixels are included in the final disparity map, $d=\{d_1, d_2, d_3 \ldots, d_n\}$. N denotes a neighbor. For example, N may indicate a 3×3 window. Accordingly, $d_j$ may correspond to a disparity value of one neighboring pixel, among neighboring pixels of the predetermined pixel denoted by $d_i$. For example, when N corresponds to a 3×3 window, $d_j$ may correspond to a disparity value of one neighboring pixel, among pixels in three columns and three rows, including $d_i$ in the center. That is, the neighboring pixels of the predetermined pixel may correspond to pixels positioned within a range predetermined based on coordinates of the predetermined pixel, among constituent pixels in the image, the initial disparity map, or the final disparity map.

$\alpha_{ij}$ denotes a color similarity between an $i^{th}$ pixel and a $j^{th}$ pixel. That is, the greater the similarity between a color of the $i^{th}$ pixel and a color of the $j^{th}$ pixel, the higher the value of $\alpha_{ij}$. It may be assumed that Equation 1 may be a-normalized.

Q may correspond to a Laplacian matrix. Q may correspond to a sparse matrix.

E denotes energy. E may correspond to a sum of difference values of the constituent pixels in the final disparity map. A difference value of a first pixel may correspond to a square of a difference between a disparity value of the first pixel, and a color-similarity-weighted disparity value of neighboring pixels of the first pixel. Accordingly, the energy E may increase when the difference between the disparity value of the first pixel, and the color-similarity-weighted disparity value of the neighboring pixels of the first pixel increases. Here, the first pixel may correspond to one of the constituent pixels.

The generating unit 130 may generate the final disparity map by determining the disparity values of the constituent pixels, to reduce the energy E.

As expressed by Equation 2, the sum of the difference values may be expressed in a quadratic form including Q at the center. A combination of disparities to reduce the energy E, that is, the final disparity map or the final disparity vector, may be optimized at a point where a differentiation value of Equation 2 becomes 0. The differentiation value of Equation 2 may correspond to a differentiation value of energy with respect to the final disparity vector. However, when a constraint associated with the initial disparity map is not provided in generating the final disparity map, a predetermined result may be produced.

The constraint may alternatively correspond to a hard constraint. A hard constraint may refer to a constraint in which pixels having disparity values that may be determined by the initial disparity map, among the constituent pixels, may have identical disparity values in the final disparity map. That is, the hard constraint may refer to a constraint in which an area for which a disparity value is filled in the initial disparity map may have an identical disparity value in the final disparity map.

The hard constraint may be expressed by Equation 3.

$$A\tilde{d}=d \quad \text{[Equation 3]}$$

where A denotes a matrix for extracting an element at a predetermined position from a vector $\tilde{d}$. A may correspond to a constraint matrix.

That is, the generating unit 130 may generate a final disparity map that may satisfy the hard constraint expressed by Equation 3, and may reduce the energy E. The generating unit 130 may generate the final disparity map that may satisfy the hard constraint expressed by Equation 3, and may reduce the energy E, based on Lagrange multipliers. The generating unit 130 may solve the Lagrange multipliers by obtaining values from a sparse linear system of equations, in a form of "Ax=b".

The constraint may correspond to a soft constraint.

A soft constraint may refer to a constraint in which the energy E may increase in accordance with an increase in a difference between a disparity value of a predetermined pixel, among the constituent pixels, in the initial disparity map and a disparity value of the predetermined pixel in the final disparity map.

When the initial disparity map is used as the soft constraint and a disparity value of a pixel having the disparity value is subject to change, an issue of reducing the energy E may be modified as expressed by Equation 4.

$$J(\tilde{d}) = E(\tilde{d}) + \lambda(\tilde{d}-d)^T D(\tilde{d}-d),$$

where $\lambda$ denotes a parameter indicating a penalty caused by a change in disparity. J denotes energy in a case in which the soft constraint is applied. E denotes a minimum value of the energy J when a disparity value of a pixel is not changed.

In order to minimize the energy J, the generating unit 130 may correct or adjust a disparity of a pixel having a disparity value contradictory to colors and disparities of neighboring pixels, in view of a disparity of each of the pixels provided in the initial disparity map. In Equation 4, a term on a right side of $\lambda$ may indicate a penalty to be applied when a first disparity value of a predetermined pixel according to the final disparity value becomes distant from second disparity value of the predetermined pixel according to the initial disparity map.

In operation 240, the output unit 140 may generate a multiview based on the image and the final disparity map, and may output the generated multiview. The output unit 140 may generate an output view at a predetermined viewpoint, by warping the image and the final disparity map to the predetermined viewpoint.

Figure 3:
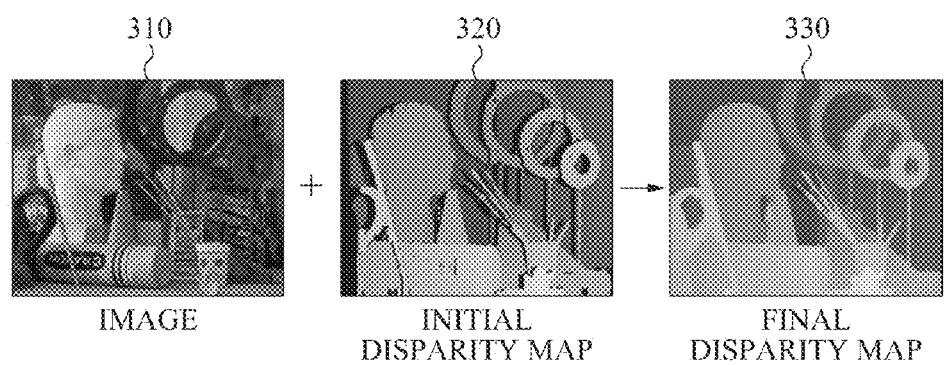
FIG. 3 illustrates a result of Quadratic Programming (QP) disparity fitting according to example embodiments.

FIG. 3 illustrates a result of QP disparity fitting according to example embodiments.

In FIG. 3, an image 310, an initial disparity map 320, and a final disparity map 330 generated by QP disparity fitting are illustrated.

In the initial disparity map 320, portions marked in black may indicate areas in which disparity values may be absent, that is, pixels for which disparity values are undetermined. In the final disparity map 330, the portions marked in black may be removed. Also, since a hard constraint is applied, portions, excluding the portions marked in black in the initial disparity map 320, that is, portions having disparity values, may remain the same in the final disparity map 330.

Figure 4:
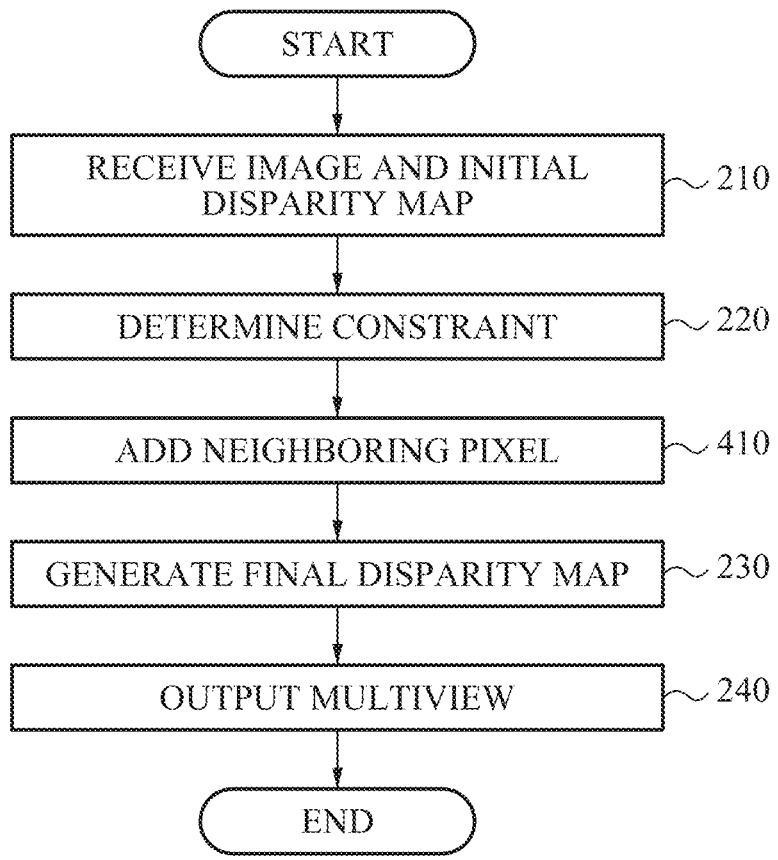
FIG. 4 illustrates an image processing method of assigning temporal consistency according to example embodiments.

FIG. 4 illustrates an image processing method of assigning temporal consistency according to example embodiments.

Temporal issues may be considered in generating a final disparity map.

When scene reconstruction or depth/disparity estimation is performed based on a stereo video or a multi-view video, different fittings may be applied to pixels corresponding to each other in temporally adjacent frames. for example, the pixels corresponding to each other is pixels having identical coordinates or positions. That is, pixels, included in consecutive frames, representing an identical point of a predetermined object may have different disparity values.

In order to resolve inconsistency in disparity values between corresponding pixels in the consecutive frames, a temporal consistency may be considered in addition to the aforementioned disparity energy model. Hereinafter, a method based on the temporal consistency will be described.

Operation 410 may supplement to operations 210 through 240 described with reference to FIG. 2.

In operation 410, the generating unit 130 of FIG. 1 may add a pixel, of a previous frame, corresponding to an $i^{th}$ pixel, as a neighboring pixel to be used for calculating the energy E. For example, in Equation 1, $d_j$ may correspond to the pixel, to the previous frame, corresponding to the $i^{th}$ pixel, apart from $N(d_i)$. $N(d_i)$ may include the pixel, of the previous frame, corresponding to the $i^{th}$ pixel, apart from pixels positioned within a range predetermined based on $d_i$. A current frame may include an image and an initial disparity map that may be processed by the generating unit 130. The previous frame and the current frame may correspond to temporally consecutive frames.

The generating unit 130 may add a fourth pixel from the previous frame to a neighboring pixel of a third pixel in the current frame. The third pixel and the fourth pixel may correspond to each other. That is, the third pixel and the fourth pixel may indicate an identical point of a predetermined object. For example, coordinates of the third pixel in the current frame may be identical to coordinates of the fourth pixel in the previous frame.

Adding the fourth pixel in the previous frame to be the neighboring pixel of the third pixel may indicate that 1) a disparity value of the fourth pixel and 2) a color similarity between the third pixel and the fourth pixel may be used to determine a disparity value of the third pixel in the current frame. Accordingly, the generating unit 130 may determine a value $\tilde{d}$ that may minimize the energy E, by setting the disparity value of the third pixel to be close to the disparity value of the fourth pixel. Thus, the generating unit 130 may determine disparity values of the corresponding pixels in the consecutive frames consistently.

The aforementioned QP disparity fitting performed in view of the temporal consistency between the frames may be referred to as QP temporal disparity fitting.

Figure 5:
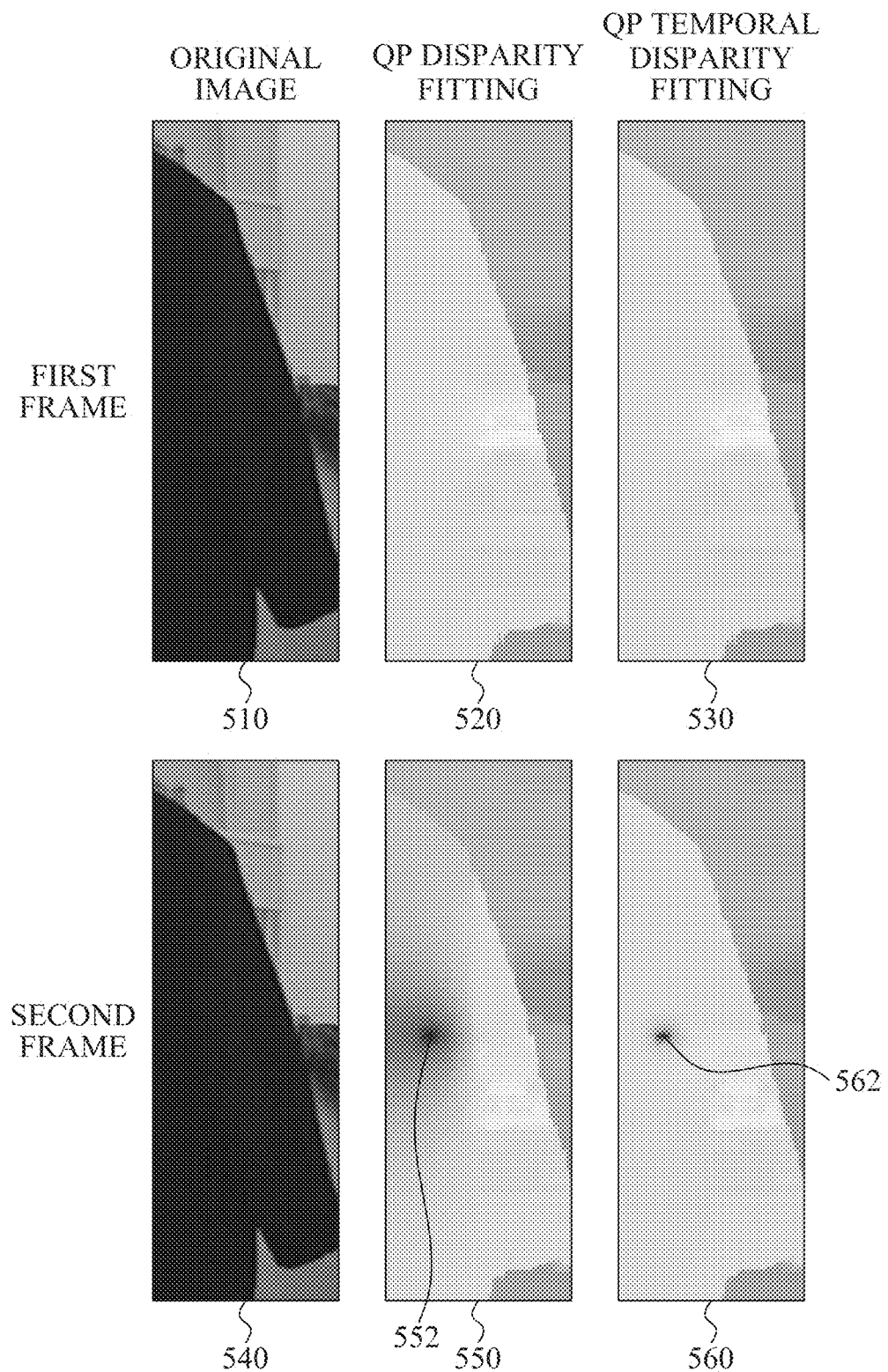
FIG. 5 illustrates a result of QP temporal disparity fitting according to example embodiments.

FIG. 5 illustrates a result of QP temporal disparity fitting according to example embodiments.

In FIG. 5, an original image 510 of a first frame, a first final disparity map 520 to which QP disparity fitting is applied, and a second final disparity map 530 to which QP temporal disparity fitting is applied are shown. Also, an original image 540 of a second frame, a first final disparity map 550 to which QP disparity fitting is applied, and a second final disparity map 560 to which QP temporal disparity fitting is applied are shown. The first frame may correspond to a previous frame of the second frame.

As shown in FIG. 2, abnormal portions 552 and 562 are generated in the first and second final disparity maps 550 and 560 of the second frame. The abnormal portion 552 in the first final disparity map 550, which may not consider a temporal consistency, may be greater than the abnormal portion 562 in the second final disparity map 560. That is, an abnormal portion may be reduced using a QP temporal disparity fitting as described.

Figure 6:
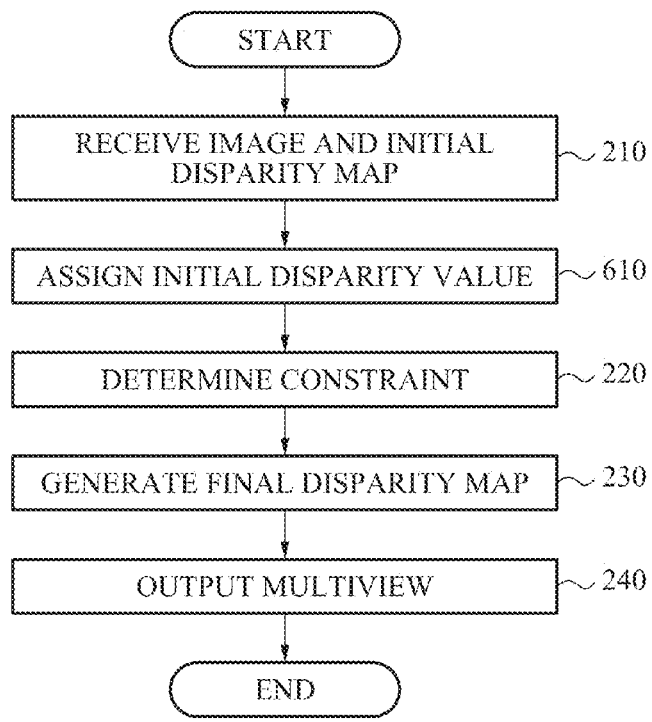
FIG. 6 illustrates an image processing method of assigning an initial disparity value according to example embodiments.

FIG. 6 illustrates an image processing method of assigning an initial disparity value according to example embodiments.

The aforementioned QP disparity fitting may be applied to a two-dimensional (2D)-to-three-dimensional (3D) conversion scenario for generating 3D content using a single piece of image.

Disparity values for constituent pixels may not be included in the initial disparity map when an initial disparity map is not provided or when the initial disparity map is empty. When disparity values for constituent pixels are not included in the initial disparity map, or when the initial disparity map is insufficient, that is, when a final disparity map is difficult to be generated using disparity information included in the initial map, initial disparity values may be assigned to all or a portion of pixels for which disparity values are undetermined in the initial disparity map.

Operation 610 may supplement operations 210 through 240 described with reference to FIG. 2.

In operation 610, the generating unit 130 may assign an initial disparity value to at least one of the pixels for which disparity values are undetermined.

In order to assign the initial disparity value, a semi-automatic scheme and an automatic scheme may be employed.

The semi-automatic scheme may refer to a scheme in which a portion of a process of assigning the initial disparity may be performed by a user. In the semi-automatic scheme, the user may determine important positions of an image by manipulating a graphical user interface (GUI), and the like, and may input the initial disparity value for the determined important positions. The user may input the initial disparity value, using various GUI input devices, for example, a brush stroke, a point, a circle, a rectangle, and the like.

The generating unit 130 may assign an initial disparity value to each of constituent pixels corresponding to the important positions of the image, for example, as determined by the user. The generating unit 130 may propagate initial disparity values assigned to the constituent pixels to the entire image or an entire disparity map, through QP disparity fitting, based on the assigned initial disparity values. In an ideal case, at least one pixel per segment of an object represented by the image may have a disparity value.

The automatic scheme may refer to a scheme in which the process of assigning the initial disparity value may be performed in the image processing apparatus 100 of FIG. 1, without interference from a user.

Assumptions made for employing the automatic scheme may include a ramp assumption. The ramp assumption is that a lower end of the object in the image may be relatively close to an observer, and an upper end of the object may be relative far from the observer. According to the ramp assumption, the generating unit 130 may assign an initial disparity value to at least one of target pixels, or at least one of the pixels for which disparity values are undetermined, in a form of a ramp.

The initial disparity value assigned by the semi-automatic scheme or the automatic scheme may be inaccurate. Accordingly, when the initial disparity value is assigned to the at least one of the pixels for which disparity values are undetermined in operation 610, the constraint determining unit 120 of FIG. 1 20 may determine a soft constraint to be applied in generation of a final disparity map, in operation 220.

The generating unit 130 may obtain an average value of initial disparity values for each segment of the object, by assigning, in a form of a ramp, the initial disparity values to all of the pixels for which disparity values are undetermined, in operation 610, and by performing QP disparity fitting under the soft constraint in operation 230. For example, when the generating unit 130 assigns initial disparity values to pixels in a predetermined segment of the image, respectively, and performs QP disparity fitting, disparities of the pixels in the predetermined segment may correspond to an average value of the initial disparity values assigned to the pixels.

The generating unit 130 may assign an initial disparity value to at least one of the pixels for which disparity values are undetermined, based on a scheme of generating various disparity or depth maps, for example, a visual attention map or a saliency map, an object/text recognition based map, a topography learning based map, and the like, apart from the ramp-shaped map.

Figure 7:
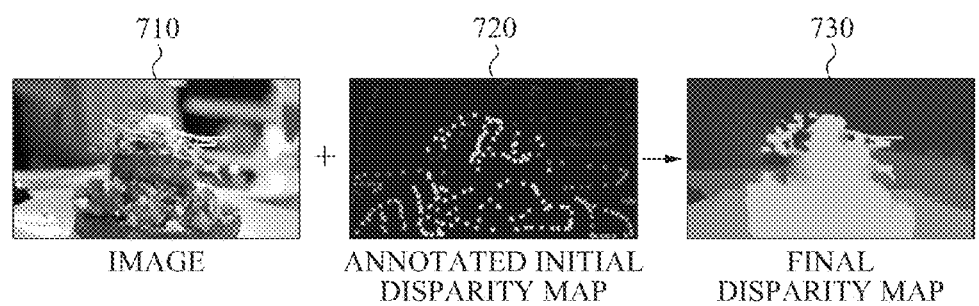
FIG. 7 illustrates a result of generating a final disparity map by assigning an initial disparity value in a semi-automatic manner according to example embodiments.

FIG. 7 illustrates a result of generating a final disparity map by assigning an initial disparity value in a semi-automatic manner according to example embodiments.

In FIG. 7, an image 710, an annotated initial disparity map 720, and a final disparity map 730 are illustrated.

The annotated initial disparity map 720 may correspond to an initial disparity map in which an initial disparity value may be assigned, by a user, to at least one of pixels for which disparity values are undetermined.

The final disparity map 730 may be generated based on the image 710 and the annotated initial disparity map 720. Generally, an initial disparity value assigned, by the user, to a predetermined pixel may be propagated in a segment including the pixel.

Figure 8:
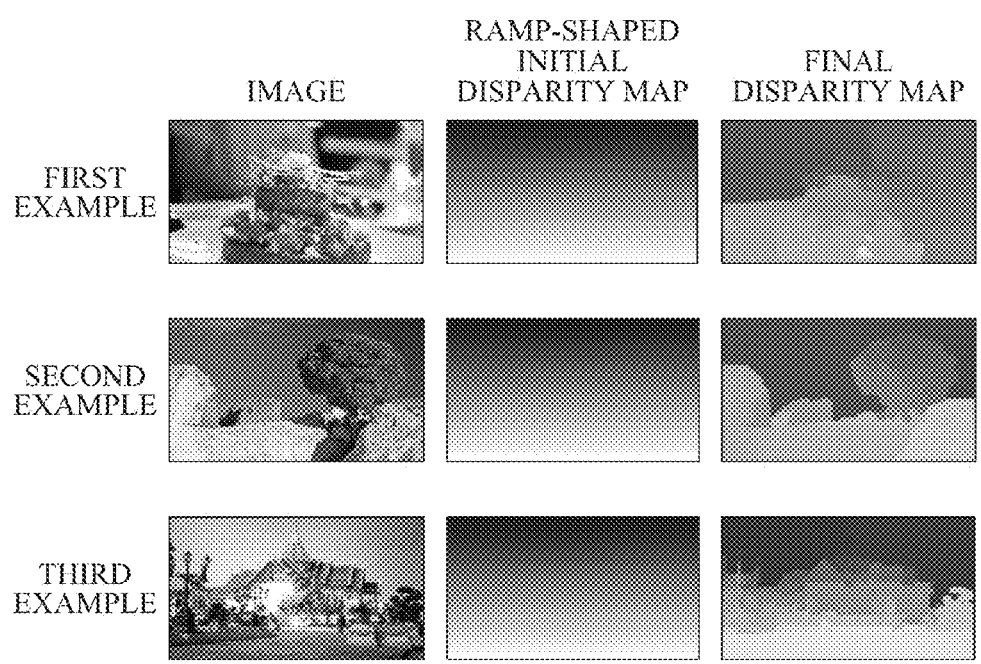
FIG. 8 illustrates a result of generating a final disparity map by assigning an initial disparity value in a form of a ramp according to example embodiments.

FIG. 8 illustrates a result of generating a final disparity map by assigning an initial disparity value in a form of a ramp according to example embodiments.

Three examples are shown in FIG. 8. An image, a ramp-shaped initial disparity map, and a final disparity map are illustrated for each example.

For each example, the generating unit 130 may generate a ramp-shaped initial disparity map by assigning, in a form of a ramp, initial disparity values to pixels of an initial disparity map, for which disparity values are undetermined. The generating unit 130 may generate a final disparity map under a soft constraint. Accordingly, pixels in the final disparity map may have adjusted disparity values, as opposed to the initial disparity values. In the final disparity map, all pixels in a segment may have a uniform disparity value. The uniform disparity value may correspond to an average of the initial disparity values assigned to the pixels in the segment.

Figure 9:
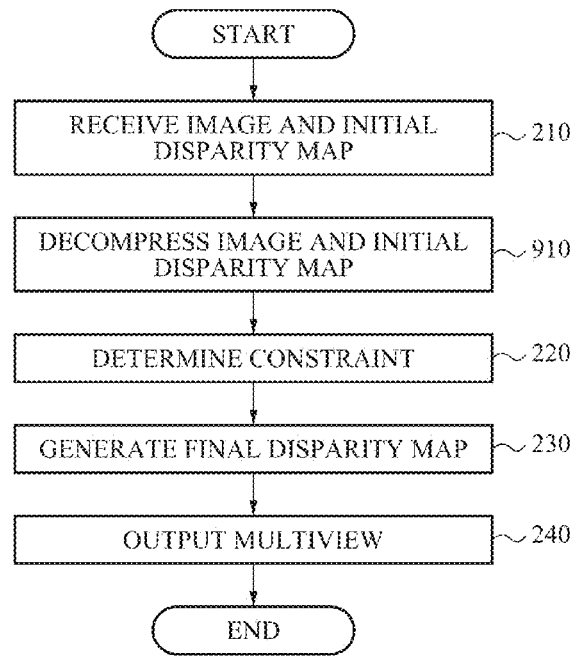
FIG. 9 illustrates a method of processing a compressed image and a compressed initial disparity map according to example embodiments.

FIG. 9 illustrates a method of processing a compressed image and a compressed initial disparity map according to example embodiments.

An image and an initial disparity map may be compressed, for example, compressed to be transmitted efficiently using minimum bandwidth. For example, the image processing apparatus 100 of FIG. 1 may receive a video including consecutive frames, and may process images and initial disparity maps included in respective frames, sequentially. In this instance, the images and the initial disparity maps in the frames may be transmitted to the image processing apparatus 100 in a compressed state through an image compressing scheme or a video compressing scheme.

Operation 910 may supplement operations 210 through 240 described with reference to FIG. 2.

In operation 210, a generated image and initial disparity map may correspond to a compressed image and initial disparity map.

In operation 910, the decompressing unit 150 of FIG. 1 may decompress the image and the initial disparity map. When the initial disparity map is compressed, a disparity value of a predetermined pixel, among target pixels, may be lost as a result of the compression. The pixel of which a disparity value is lost may become a pixel for which a disparity value is undetermined after decompression. That is, the pixel for which a disparity value is undetermined may be generated due to data of the initial disparity map lost as a result of compressing the initial disparity map.

Figure 10:
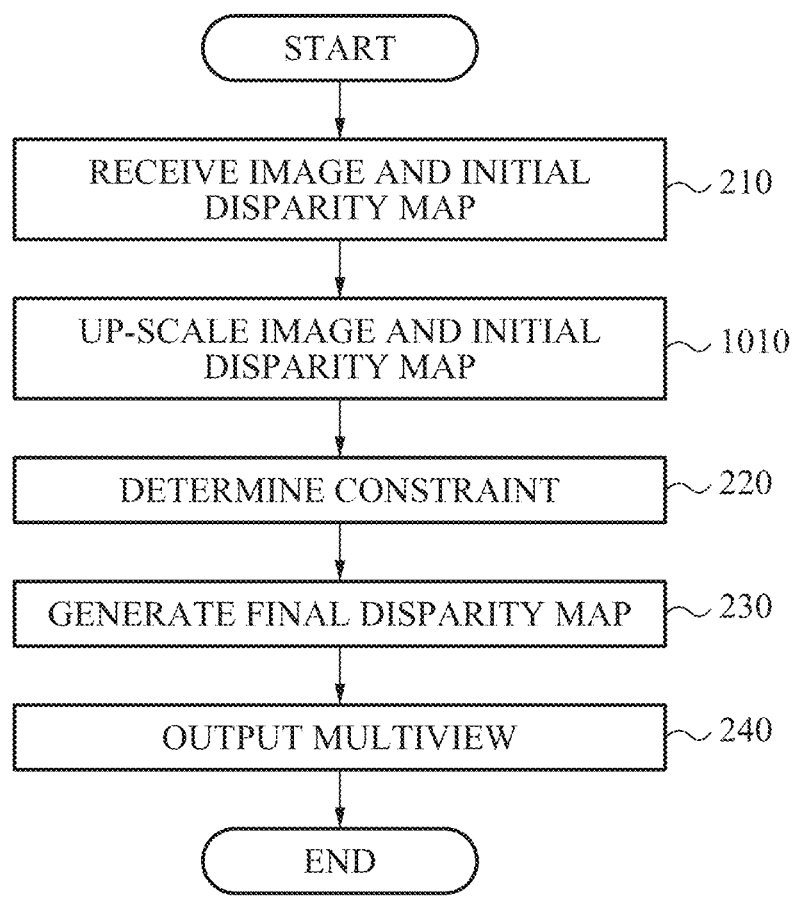
FIG. 10 illustrates a method of processing an image by up-scaling an initial disparity map according to example embodiments.

FIG. 10 illustrates a method of processing an image by up-scaling an initial disparity map according to example embodiments.

When an image and a disparity map are up-scaled, a misalignment between the image and the disparity map may occur at a high probability in a high-frequency component area of the image. Here, the high-frequency component area may refer to an area where pixels having a difference in colors may be adjacent to each other, for example, an area corresponding to a border between objects. Accordingly, there is a desire for a method of maintaining an alignment or a consistency between a color of a pixel and a disparity of the pixel, in up-scaling the image and the disparity map.

Operation 1010 may supplement operations 210 through 240 described with reference to FIG. 2.

In operation 1010, the generating unit 130 may up-scale an image and an initial disparity map.

The up-scaling unit 160 may up-scale the image including color information, using a super-resolution technology, and the like.

The generating unit 160 may up-scale the initial disparity map, using pixel repetition, zero padding, or the like.

The pixel repetition may correspond to a method of up-scaling the initial disparity map by repeating a pixel in a horizontal direction or a vertical direction. For example, when the initial disparity map is up-scaled by a factor of two in a horizontal direction, and by a factor of two in a vertical direction, a single pixel may be expanded to four pixels. By way of the pixel repetition, the four pixels generated by the expansion may have identical disparity values.

Zero padding may correspond to a method of not assigning disparity values to pixels added by the up-scaling. That is, zero padding may correspond to a method of setting the pixels added by the up-scaling to be pixels for which disparity values are undetermined.

When the initial disparity map is up-scaled by the pixel repetition, the constraint determining unit 120 may determine to use a soft constraint in operation 220. In operation 230, the generating unit 130 may generate a final disparity map under the soft constraint. Accordingly, the pixels having identical disparity values by the pixel repetition may have disparity values adjusted to be different, in the final disparity map.

When the initial disparity map is up-scaled by the zero padding, the generating unit 130 may assign disparity values to pixels for which disparity values are undetermined, that is, the pixels added by the up-scaling, in operation 230.

Figure 11:
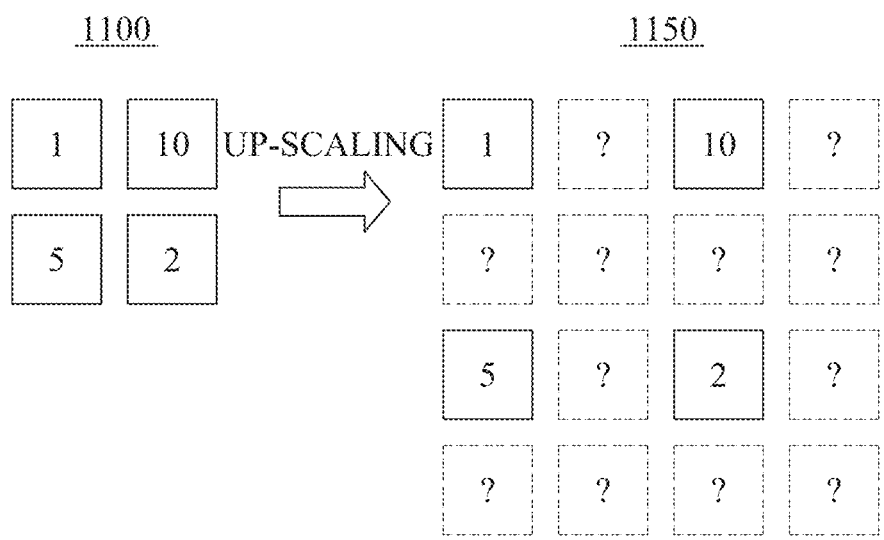
FIG. 11 illustrates zero padding according to example embodiments.

FIG. 11 illustrates zero padding according to example embodiments.

An initial disparity map 1100 may include four pixels, and the pixels may have disparity values of "1," "10,", "5," and "2," respectively. The initial disparity map 1100 may be expanded by a factor of two horizontally, and by a factor of two vertically.

An initial disparity map 1150 expanded by the up-scaling may have sixteen pixels. Here, the four pixels may correspond to the pixels in the initial disparity map 1100 prior to the up-scaling, and the other twelve pixels may correspond to pixels added by the up-scaling.

The pixels in the initial disparity map 1100 existing prior to the up-scaling may have disparity values identical to the disparity values that the pixels may have in the initial disparity map 1100.

The pixels added by the up-scaling may not have disparity values. That is, the pixels added by the up-scaling may become pixels for which disparity values are undetermined.

The method or methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
    a receiver configured to receive an image comprising color information of pixels and an initial disparity map comprising disparity information of the pixels, wherein disparity information for at least some of the pixels in the initial disparity map is undetermined;
    a constraint determining processor configured to determine a constraint; and
    a generator configured to generate a final disparity map by assigning similar disparities to two pixels that are adjacent to each other and that have similar colors, among the pixels, under the determined constraint, the final disparity map comprising a disparity value for each of the pixels.

2. The apparatus of claim 1, wherein the constraint corresponds to a hard constraint in which pixels having disparity values determined by the initial disparity map, among the pixels, have identical disparity values in the final disparity map.

3. The apparatus of claim 1, wherein
    the generator generates the final disparity map by determining a disparity value of each of the pixels, to minimize energy,
    the energy increases in accordance with an increase in a difference between a disparity value of a first pixel and a color-similarity-weighted disparity value of neighboring pixels of the first pixel,
    the first pixel corresponds to a predetermined pixel among the pixels, and
    the neighboring pixels of the first pixel correspond to pixels positioned within a range predetermined based on coordinates of the first pixel, among the pixels.

4. The apparatus of claim 3, wherein the constraint corresponds to a soft constraint in which the energy increases in accordance with an increase in a difference between a disparity value of a second pixel in the initial disparity map and a disparity value of the second pixel in the final disparity map.

5. The apparatus of claim 3, wherein
    the generator adds a fourth pixel from a previous frame to a neighboring pixel of a third pixel in a current frame,
    coordinates of the third pixel in the current frame are identical to coordinates of the fourth pixel in the previous frame,
    the current frame comprises the image and the initial disparity map, and
    the previous frame and the current frame correspond to temporally consecutive frames.

6. The apparatus of claim 1, wherein the generator assigns an initial disparity value to at least one of the pixels for which disparity values are undetermined.

7. The apparatus of claim 6, wherein the generator assigns the initial disparity value to at least one of the pixels for which disparity values are undetermined, in a form of a ramp.

8. The apparatus of claim 1, further comprising:
    a decompressing unit to decompress the image and the initial disparity map when the image and the initial disparity are compressed,
    wherein the pixels for which disparity values are undetermined are generated due to data of the initial disparity map that is lost as a result of compressing the initial disparity map.

9. The apparatus of claim 1, further comprising:
    an up-scaling unit to up-scale the image and the initial disparity map.

10. An image processing method, comprising:
    receiving an image comprising color information of pixels and an initial disparity map comprising disparity information of the pixels, wherein disparity information for at least some of the pixels in the initial disparity map is undetermined;
    determining a constraint; and
    generating a final disparity map by assigning similar disparities to two pixels that are adjacent to each other and that have similar colors, among the pixels, under the determined constraint, the final disparity map comprising a disparity value for each of the pixels.

11. The method of claim 10, wherein the constraint corresponds to a hard constraint in which pixels having disparity values determined by the initial disparity map, among the pixels, have identical disparity values in the final disparity map.

12. The method of claim 10, wherein
    the final disparity map is generated by determining a disparity value of each of the pixels, to minimize energy, the energy increases in accordance with an increase in a difference between a disparity value of a first pixel and a color-similarity-weighted disparity value of neighboring pixels of the first pixel, the first pixel corresponds to a predetermined pixel among the pixels, and the neighboring pixels of the first pixel correspond to pixels positioned within a range predetermined based on coordinates of the first pixel, among the pixels.

13. The method of claim 12, wherein the constraint corresponds to a soft constraint in which the energy increases in accordance with an increase in a difference between a disparity value of a second pixel in the initial disparity map and a disparity value of the second pixel in the final disparity map.

14. The method of claim 12, further comprising:
adding a fourth pixel from a previous frame to a neighboring pixel of a third pixel in a current frame,
wherein
coordinates of the third pixel in the current frame are identical to coordinates of the fourth pixel in the previous frame,
the current frame comprises the image and the initial disparity map, and
the previous frame and the current frame correspond to temporally consecutive frames.

15. The method of claim 10, further comprising:
assigning an initial disparity value to at least one of the pixels for which disparity values are undetermined.

16. The method of claim 15, wherein the initial disparity value is assigned to at least one of the pixels for which disparity values are undetermined, in a form of a ramp.

17. The method of claim 10, further comprising:
decompressing the image and the initial disparity map when the image and the initial disparity are compressed, wherein the pixels for which disparity values are undetermined are generated due to data of the initial disparity map that is lost as a result of compressing the initial disparity map.

18. The method of claim 10, further comprising:
up-scaling the image and the initial disparity map.

19. A non-transitory computer-readable medium comprising a program for instructing a computer to perform the method of claim 10.

20. An image processing apparatus, comprising:
a receiver configured to receive an image comprising color information of pixels and an initial disparity map comprising disparity information of the pixels, wherein at least a portion of the pixels in the initial disparity map are disparity-undetermined pixels having undetermined disparity values;
a constraint determining processor configured to determine a constraint; and
a generator configured to generate a final disparity map by assigning similar disparities to two pixels that are adjacent to each other, from among the pixels, under the determined constraint, the final disparity map comprising a disparity value for each of the pixels.

21. The apparatus of claim 20, wherein the generator assigns similar disparities to the two adjacent pixels when one of the pixels is a disparity-undetermined pixel and another of the pixels has a determined disparity value and has a color similar to a color of the disparity-undetermined pixel.

22. The apparatus of claim 1, wherein the generator is further configured to determine the disparity value of a disparity undetermined pixel based on the disparity value of a pixel adjacent to the disparity undetermined pixel, wherein the pixel adjacent to the disparity undetermined pixel comprises a disparity value and a color similar to the disparity undetermined pixel.

* * * * *